United States Patent [19]

Brown et al.

[11] Patent Number: 4,502,714
[45] Date of Patent: Mar. 5, 1985

[54] VACUUM SPOOL PIECE AND JOINT

[75] Inventors: Richard A. Brown, Gahanna; Richard K. Wilson, Sunbury, both of Ohio

[73] Assignee: CVI Incorporated, Columbus, Ohio

[21] Appl. No.: 426,407

[22] Filed: Sep. 29, 1982

[51] Int. Cl.³ .............................................. F16L 59/14
[52] U.S. Cl. ..................................... 285/47; 138/149; 285/227; 285/DIG. 5
[58] Field of Search .................. 285/227, 47, 53, 114, 285/DIG. 5; 138/149

[56] References Cited

U.S. PATENT DOCUMENTS

| | | | |
|---|---|---|---|
| 2,437,385 | 3/1948 | Halford | 285/227 X |
| 2,568,923 | 9/1951 | McNeary et al. | 285/114 X |
| 2,661,963 | 12/1953 | Brown et al. | 285/114 |
| 3,095,220 | 6/1963 | Johnston et al. | 285/114 |
| 3,259,402 | 7/1966 | Wyatt | 138/149 X |
| 3,360,001 | 12/1967 | Anderson | 137/375 |
| 3,369,826 | 2/1968 | Boosey et al. | 138/149 X |
| 4,162,093 | 7/1979 | Sigmund | 285/47 |
| 4,219,224 | 8/1980 | Hanley | 285/47 |
| 4,332,401 | 6/1982 | Stephenson et al. | 285/47 |

Primary Examiner—Thomas F. Callaghan
Attorney, Agent, or Firm—Seidel, Gonda & Goldhammer

[57] ABSTRACT

A joint is made from first and second vacuum spool pieces connected end to end. Each spool piece includes an inner conduit surrounded by and spaced from an outer jacket. Each outer jacket includes an expansion-contraction portion adjacent each end thereof. Each end portion of each jacket has a first member in sealing contact with a mating second member on the inner conduit for retaining a vacuum in the annular space. After two spool pieces are joined, the first and second members are shifted relative to one another so as to preclude any direct conductive heat leak path and permit the vacuum in the annular space of one spool piece to communicate with the vacuum in the annular space of the other spool piece.

7 Claims, 4 Drawing Figures

VACUUM SPOOL PIECE AND JOINT

BACKGROUND

A vacuum jacketed pipeline is taught by U.S. Pat. No. 3,360,001 dated Dec. 26, 1967 and issued to J. H. Anderson on a Vacuum Jacketed Pipeline And Joint Construction Therefor. A similar pipeline with insulation in the annular space between the jacket and inner conduit is taught by U.S. Pat. No. 4,219,224 dated Aug. 26, 1980 and issued to B. C. Hanley on a Cryogenic Pipeline System. Each of said patents recognizes the problem of a heat leak path between the jacket and the inner conduit. Each patent solves the problem by using low heat conducting material extending between the jacket and the inner conduit. Even with low heat conducting materials, there still remains a direct conductive heat leak path.

The present invention solves the problem of minimizing heat leak between the inner conduit and jacket at the joint while providing a spool member capable of being vacuum tested at the factory for leaks after bake-out of the annular space between the inner conduit and the jacket, while at the same time providing a spool member which will not have a direct conductive heat leak path between the jacket and the inner conduit when installed.

SUMMARY OF THE INVENTION

The spool piece of the present invention is adapted to be connected end to end with a like spool piece at a joint. The spool piece includes an inner conduit surrounded by and spaced from an outer jacket. The outer jacket is shorter than the inner conduit. Each end of the inner conduit projects beyond the adjacent end of the jacket. The outer jacket includes an expansion-contraction portion adjacent each end thereof. Each end portion of the jacket has a first member in sealing contact with a mating second member on said inner conduit, and one of said members being movable to interrupt the seal with its mating member.

It is an object of the present invention to provide a novel vacuum spool piece which may be factory tested by evacuating the same for detection of leaks.

It is another object of the present invention to provide a vacuum spool piece which can be cold shock tested with liquefied gas in the inner conduit.

It is another object of the present invention to provide a novel joint between like spool pieces connected end to end.

It is another object of the present invention to provide a vacuum spool piece which does not have a direct conductive heat leak path between an inner conduit and a surrounding jacket at the joint.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 4 is a sectional view of one end of an alternative spool piece.

DETAILED DESCRIPTION

Figure 1:
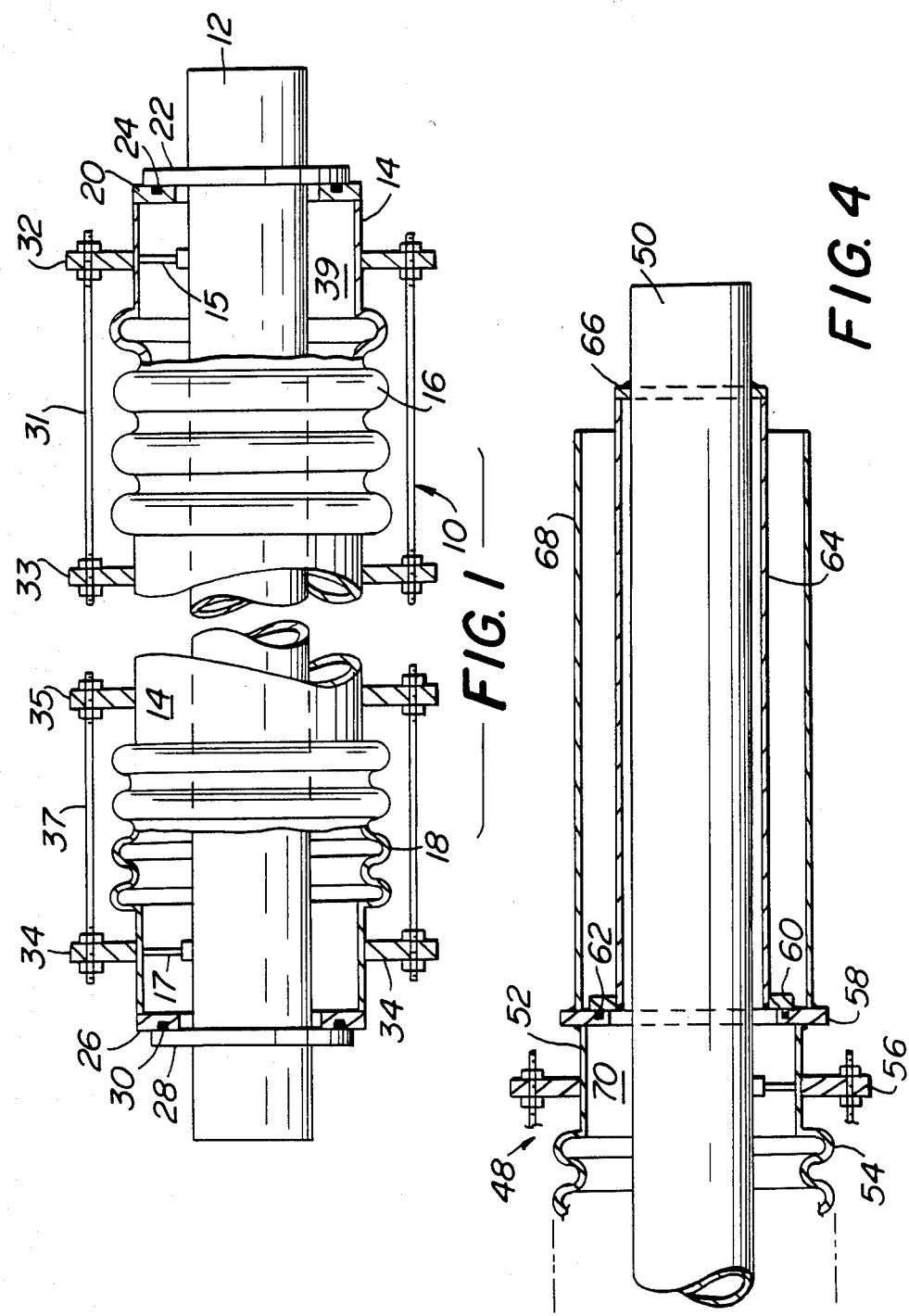
FIG. 1 is an elevation view of a spool piece in accordance with the present invention and partly in section.

Referring to the drawings in detail, wherein like numerals indicate like elements, there is shown in FIG. 1 a spool piece in accordance with the present invention designated generally as 10. The spool piece 10 includes an inner conduit 12 which may be used to convey cryogenic fluid. Conduit 12 is surrounded by an outer jacket 14. It will be noted that the inner conduit 12 is longer than the jacket 14. Each end of the inner conduit 12 projects beyond the adjacent end of the jacket 14.

In order to maintain concentricity between conduit 12 and jacket 14 within a predetermined range, low heat conducting spacers may be provided. The preferred spacers are sets of 3 rods or tubes of phenal die cast plastic designated 15 and 17 adjacent the opposite ends of the jacket 14. The 3 spacers 15 are attached to the periphery of conduit 12 and arranged 120 degrees apart. The spacers 15 have a length so that only two spacers 15 contact the inner surface of jacket 14 at any time. The spacers 17 are identical to spacers 15.

Adjacent one end, the jacket 14 has an expansion-contraction portion 16 which may take the form of a bellows as illustrated. Adjacent is the other end, the jacket 14 has a similar portion 18. At the righthand end of jacket 14, there is provided a radially inwardly directed plate 20. A plate 22 on the inner conduit 12 overlies a side face of plate 20. One of the plates such as plate 20 has a groove on a side face thereof and which contains a seal such as an O ring 24.

At the lefthand end of the jacket 14 in FIG. 1, there is provided a radially inwardly directed plate 26. A plate 28 on the inner conduit 12 overlies a side face of the plate 26. Plate 26 is provided with an annular groove on a side face thereof and which contains a seal such as O ring 30. The plates 20, 22, 26 and 28 are annular. The mating plates 20, 22 and the mating plates 26, 28 act as valves. Hence, the thusly described spool piece 10 may be factory tested for leaks by shifting plate 22 to seal relative to plate 20, and evacuating the annular space 39 between conduit 12 and jacket 14. Also, the thusly described spool piece allows the space 39 to be baked out by introducing heated air thereinto to thereby obtain better vacuum retention. It is a distinct advantage of the present invention to be able to vacuum test and bake out the spool piece at the factory.

Plates 32 and 33 are fixedly secured to the outer periphery of jacket 14 on opposite sides of the expansion-contaction portion 16. Plates 32 and 33 are interconnected by a plurality of rods 31 and nuts. By adjusting the nuts, the portion 16 may be expanded or contracted. Similar plates 34, 35 are secured to the jacket 14 on opposite sides of the portion 18. Plates 34, 35 are similarly coupled by rods 37 for the same purpose. The purpose of portions 16, 18 will be made clear hereinafter.

Figures 2, 3:
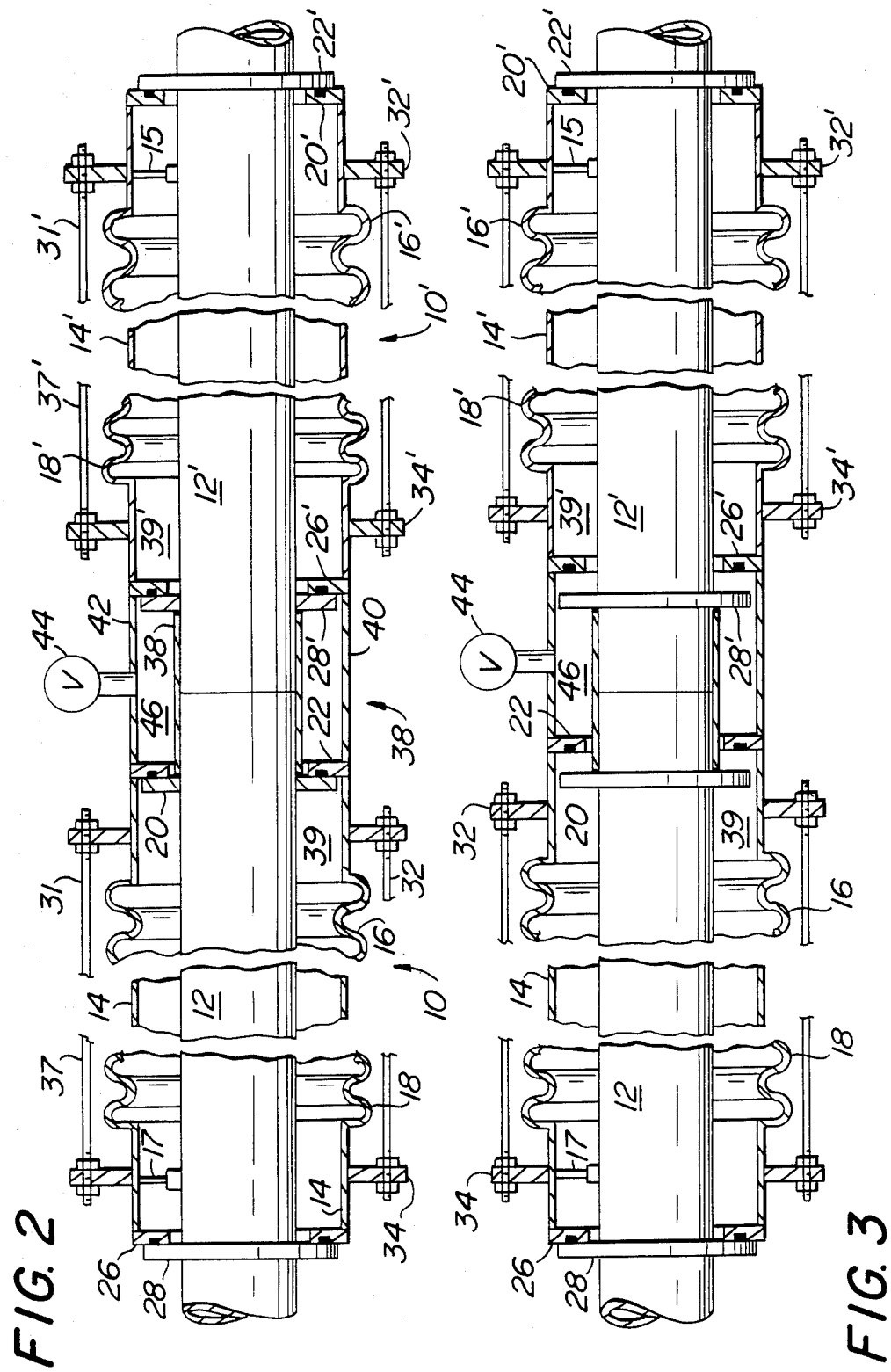
FIG. 2 is a joint of two spool pieces of the type shown in FIG. 1.
FIG. 3 is a view similar to FIG. 2 but showing direct communication between the annular spaces of the spool pieces after being joined together.

Referring to FIG. 2, there is illustrated a joint between a pair of identical spool pieces designated generally as 10 and 10'. Corresponding elements of spool piece 10' are identified by corresponding primed numerals. During manufacture of the spool pieces 10 and 10', portion 18' was expanded for a short distance such as one-half inch by adjusting the nuts associated with the rods 37'. Similarly, portion 16 was contracted a similar amount by adjusting the nuts associated with rods 31. Spool pieces are connected end to end by first welding the projecting portions of the inner conduits 12 and 12' during field installation of the spool pieces. Thereafter, multilayers of super insulation 38 are wrapped around the welded joint.

The super insulation may be any one of a wide variety of commercially available materials such as Mylar, Dexstar paper, etc. Thereafter, chamber 46 is formed by welding jacket pieces 40, 42. The jacket pieces 40, 42 have the same diameter as the outer jacket 14. One of the jacket pieces such as jacket piece 42 has a valved conduit 44 to facilitate evacuation of the space 46. After the joint is formed and evacuated as described above, the nuts associated with rods 31 and 37 are adjusted to a normal position whereby portion 16 will expand and portion 18' will contract. As a result thereof, the plates 22 and 26' will shift axially from the position shown in FIG. 2 to the position shown in FIG. 3. This results in evacuated chamber 39 being in direct communication with evacuated chamber 46 which in turn is in direct communication with evacuated chamber 39'. The low heat conducting spacers 15, 17 minimize any change of concentricity between jacket 14 and conduit 12 during this operation.

Thus, it will be noted that the valves at the ends of the spool piece 10 facilitate factory testing of the spool piece and also facilitate making the field joint as shown in FIG. 2 without contaminating or losing vacuum on the pre-evacuated spool pieces which may subsequently be placed in communication with each other as shown more clearly in FIG. 3. As shown in FIG. 3, there is no direct conductive heat leak between the inner conduits 12, 12' and the outer jackets 14, 14'. It will be understood that the valves at the extreme ends of the unit illustrated in FIG. 3 will be subsequently opened in a like manner when joined to another spool piece.

In FIG. 4, there is illustrated one end of a spool piece 48. Spool piece 48 is identical with spool piece 10 except as will be made clear hereinafter. While only one end of the spool piece 48 is shown in FIG. 4, it is constructed in an identical manner at each end as described with respect to spool piece 10. The inner conduit is designated 50 and spaced radially inwardly from the outer jacket 52. Jacket 52 has an expansion-contraction portion 54 adjacent the end of the spool piece 48 shown in FIG. 4.

A plate 56, comparable to plate 32, is attached to the outer periphery of the outer jacket 52. Plate 56 will cooperate with a mating plate on the opposite side of portion 54 in the same manner as described above to expand or contract portion 54. The outer jacket 52 has a radially inwardly extending plate 58 to which is welded a jacket extension 68. A plate 60 overlies a side face of plate 58. A seal 62 is provided in a groove on a side face of plate 58. Plate 60 is welded to one end of a sleeve 64 surrounding the inner tube 50. The other end of sleeve 64 is welded to a plate 66 attached to the inner conduit 50. The spool piece 48 has all of the attributes of spool piece 10 in addition to permitting the spool piece to be cold shock tested by passing liquid nitrogen or some other fluid through the tube 50 and observing the appearance of frost on the outer periphery of the jacket 52. This spool piece 48 is utilized to field install a pipe joint in the same manner as described above.

The present invention may be embodied in other specific forms without departing from the spirit or essential attributes thereof and, accordingly, reference is made to the appended claims, rather than to the foregoing specification, as indicating the scope of the invention.

We claim:

1. A spool piece adapted to be connected end to end with a like spool piece at a joint comprising an inner conduit surrounded by and spaced from an outer jacket which is shorter than said inner conduit, each end of said inner conduit projecting beyond the adjacent end of said jacket, said outer jacket including an expansion-contraction portion adjacent each end thereof, each end portion of said jacket having a first member in sealing contact with a mating second member, said second member being mounted on said inner conduit, and one of said first and second members being movable to interrupt the seal between said mating members.

2. A spool piece in accordance with claim 1 wherein said first and second members are radially disposed and have overlapping radial faces in sealing contact with one other.

3. A spool piece in accordance with claim 2 including a sleeve surrounding and connected at one end to said inner conduit, said second member being mounted on the other end of said sleeve.

4. A spool piece in accordance with claim 1 wherein said expansion-contraction portions are bellows forming part of the outer jacket, and means on the outer jacket for retaining one bellows in a contracted position and for retaining the other bellows in an expanded condition.

5. A spool piece in accordance with claim 4 wherein said last-mentioned means includes a pair of plates fixed to the outer periphery of the outer jacket on opposite sides of each bellows, and adjustable rods extending between the plates associated with each of the bellows.

6. A spool piece in accordance with claim 1 including low heat conducting spacers radially disposed in the chamber between said inner conduit and said jacket for maintaining concentricity within a predetermined range.

7. A joint between like spool pieces connected end to end in the field comprising first and second spool pieces, each spool piece including an outer jacket surrounding and spaced from an inner conduit, each jacket being shorter than its inner conduit, said outer jacket including an expandable portion adjacent each end thereof, each end portion of said jacket having a first member in sealing contact with a mating second member, said second member being supported by said inner conduit, one of said first and second members being movable to interrupt the seal with its mating member, adjacent ends of said inner conduit being welded together, a jacket piece welded to the adjacent ends of said jackets to form an annular chamber surrounding the weld, said chamber being evacuated and communicating with the annular space in each spool piece after shifting the outer jacket in an axial direction sufficiently to separate the first and second members on said spool pieces, and the annular chambers in each spool piece being free from any structure extending between the inner conduit and the outer jacket.

* * * * *